Jan. 19, 1943.                J. W. HATCH                 2,308,956
                     FLOATING TYPE HYDRAULIC PISTON
                         Filed March 23, 1940
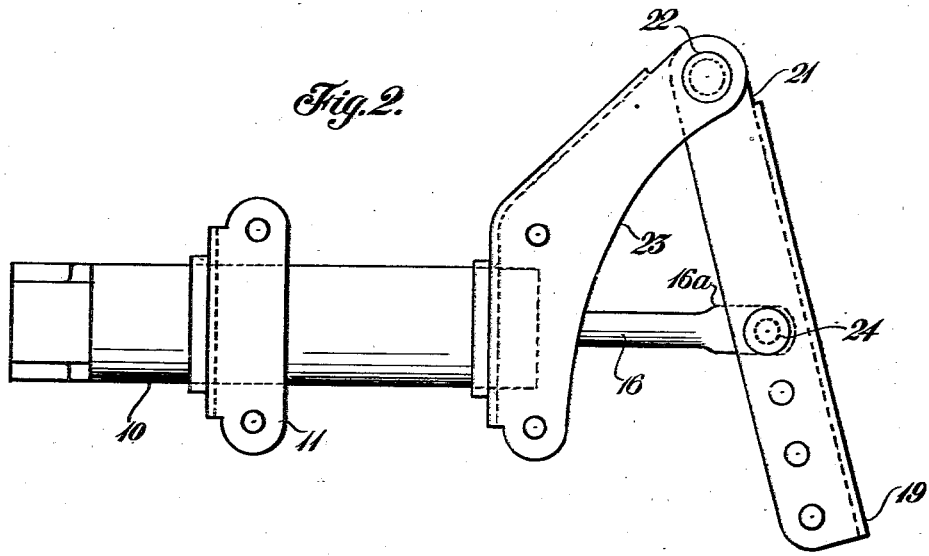
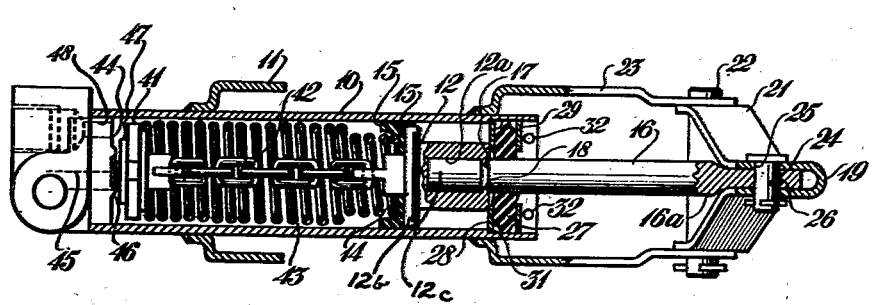
INVENTOR
James W. Hatch
BY                                      Ely & Frye
ATTORNEYS Patented Jan. 19, 1943

2,308,956

UNITED STATES PATENT OFFICE 2,308,956

FLOATING TYPE HYDRAULIC PISTON

James W. Hatch, Akron, Ohio, assignor to The Firestone Tire & Rubber Company, Akron, Ohio, a corporation of Ohio Application March 23, 1940, Serial No. 325,604

6 Claims. (Cl. 60—54.6)

This invention relates to hydraulic pressure systems and, more especially, to a floating type hydraulic piston for use in such pressure systems.

Heretofore in hydraulic brake constructions, with which the present invention is particularly adapted to be used, a master pressure chamber has been provided. This pressure chamber normally is positioned immediately adjacent the brake pedal arm, or other means used to apply the brakes manually, which arm or means usually has arcuate movement. A suitable piston is provided in the pressure chamber, which piston is adapted to receive only axial reciprocating motion so that some intermediate connecting member is necessary to connect the piston rod to the brake application means so that the slight arcuate movement usually produced thereby is transformed into pure axial reciprocating motion before being applied to the piston rod.

An important object of this invention resides in the provision of an improved piston comprising a rigid head and resilient walls, the resilient walls being adapted to engage the walls of an associated cylinder in fluid sealing relation therewith while permitting universal movement between the piston head and the sealing walls of the cylinder, whereby the piston may be actuated by a rod having one end fixed to the head and an opposite end engaging a driving member transcribing an arcuate path, without breaking the sealing relation of said piston and cylinder.

A further object is to provide an improved piston having a rigid head adapted to engage the walls of an associated cylinder in substantial line contact, whereby to minimize vibration and prevent lateral movement of the piston during reciprocation, and resilient piston walls engaging the cylinder walls in fluid sealing relation therewith to allow relative movement between the piston head and walls without disturbing the seal between the piston and cylinder walls.

Another object of the invention is to provide an improved seal in a pressure chamber whereby a piston head can be given slight arcuate movement without breaking the seal formed thereby in the chamber or without injuring itself or the walls of the pressure chamber.

A further object of the invention is to provide a novel and improved floating type hydraulic piston which is easily and inexpensively constructed, but which has a long, serviceable life.

The foregoing and other objects will be manifest from the specification.

The invention will be described with particular reference to the accompanying drawing, in which:

Figure 1 is a vertical sectional elevation of apparatus embodying the invention; and Figure 2 is a plan of the apparatus of Figure 1.

Referring specifically to the apparatus shown in the accompanying drawing, a cylindrical pressure chamber 10 carries a split annular member 11 on its outer surface, which member is provided to aid in mounting the pressure chamber 10 in its operable position upon frame means (not shown). Any suitable incompressible fluid is received in the pressure chamber 10. The pressure chamber 10 receives a piston 12 therein having a head portion, 12b of maximum diameter at the forward or leading margin 13 thereof, for engagement with the cylinder walls. Note that the remaining edge portion of the piston head 12b, that is of substantially the same diameter as the leading surface 13, is substantially arcuate in contour, the arc defined by the edge of the piston head 12 being centered at the center of the leading surface 13 whereby the piston head 12 is only in substantially line, or circular contact with the wall of the pressure chamber 10. This construction is a feature of the present invention. A sealing cup 14 is associated with the surface 13 and extends over and covers same. This sealing cup has a cylindrical wall 15 extending forwardly therefrom to engage the walls of cylinder 10 in fluid sealing relation. Usually the sealing cup is made from rubber and is vulcanized to the piston head 12. The piston head 12 is of reduced diameter adjacent the rear thereof to provide a connection block 12c having a cylindrical recess 12a formed therein which receives the end of a piston rod 16. This piston rod has an annular groove 17 formed therein which receives an inwardly extending annular boss 18 formed at the rear of the piston head 12 whereby the piston rod and piston head are held in engagement.

Suitable means connect the free end 16a of the piston rod 16 with means actuated by the brake control pedal normally present in vehicles. In accordance with the present invention, these means may include a pressure arm 19, having a bifurcated end 21 that is pivotally mounted on a pin 22. This pin is journalled in an extended anchor arm 23 carried by the pressure chamber 10, which arm 23 may aid in mounting the pressure chamber. A pintle 24 extends through a hole 25 formed in the pressure arm 19 and through a hole 26 formed in the end 16a of the piston rod 16 to secure the piston rod directly to the pressure arm 19.

The piston rod 16 is sealed in the pressure chamber 10 and its outward movement relative thereto is limited by a rubber sealing ring 27 that is received in the end of the pressure chamber 10. This sealing ring 27 is positioned by annular washers 28 and 29 which, in turn, are held in place by abutting on a shoulder 31 formed in the bore of the pressure chamber 10 and by pins 32 extending through the pressure chamber 10, respectively.

From the foregoing, it will be observed that the piston rod 16 is fixedly secured to, or possibly integral with the piston head 12 and that the piston rod is given a substantially reciprocal movement in the pressure chamber 10 through the pressure arm 19. The pivotal movement in the pressure arm 19, since the end of the piston rod is fixedly secured thereto, also move the end of the piston rod through a small arc relative to the axis of the pressure chamber 10. The slight arcuate movement of the piston rod does not damage or destroy the seal formed in the pressure chamber by the piston head 12 and the rubber sealing cup 14 as the rubber member is forced back against the piston head by fluid within the piston chamber. Also, the piston head 12 is of such construction that slight arcuate movement thereof does not force any portion of the piston head into the chamber wall so as to scratch or mar same. Hence it is seen that the present construction is simpler than and possesses advantages over constructions shown in the prior art for similar purposes. An important advantage resides in the minimization of piston vibration and noise due to the piston being snuggly engaged with a minimum metallic contact between piston and cylinder.

The remaining parts of the master cylinder for the brake are of substantially standard construction and include a valve head 41 that is secured to the piston head 12 by a chain 42. A spring 43 surrounds the chain 42 and bears against the valve head 41 and the piston head 12 to retain same apart. This valve head 41 is adapted to engage with a sealing head 44 suitably secured in the exit end of the pressure chamber 10. This sealing head 44 has a substantially axially positioned inlet port 45 therein which connects to a suitable reservoir (not shown) for the fluid means within the pressure chamber 10. An annular boss 46 is formed around the port 45 and is designed to engage with an end member 47 carried on the forward side of the valve head 41. An outlet port 48 is formed in the sealing head 44 adjacent the periphery thereof. This outlet port 48 connects to suitable means (not shown) which transfer fluid from the pressure chamber 10 to the separate brake shoes (not shown) operated from the pressure chamber 10. Then upon forward movement of the piston head 12, the spring 43 forces the valve head 41 to seat against the sealing head 44, which operation forces a small volume of fluid from the pressure chamber 10 through the inlet port 45. Then after the boss 46 has been seated in the end member 47, fluid can be forced from the pressure chamber 10 only around the periphery of the valve head 41 and through the outlet port 48, which effects the desired braking action.

While a written description and illustration of one embodiment of the invention is disclosed herein, it will be understood that modifications can be made without departing from the scope of the invention as defined in the appended claims.

What is claimed is:

1. In a fluid pressure device, the combination with a cylinder, of a piston disposed for reciprocation therein and comprising a disk-like rigid head having a planiform leading surface and transversely arcuate side walls, a piston rod fixedly connected to the trailing side of said head, and a resilient sealing member bonded to the leading side thereof and provided with wall portions of substantial length engaging the cylinder walls in continuous fluid sealing relation for a substantial distance along said cylinder wall, said head margins engaging the cylinder walls in substantially line contact, whereby to allow universal movement of said head in respect to said walls without disturbing the sealing engagement between the resilient member and the walls of the cylinder.

2. A cylinder and piston construction comprising a cylinder having a sealing head provided with an inlet port, a piston in said cylinder, said piston having a disc-like rigid head portion formed with a planar leading face and an arcuate leading edge, the maximum diameter of said disc like head portion being at its leading edge, the relative diameter of the disc like head and the inside of the cylinder being such that the disc like head makes substantial line contact with the wall of the cylinder, a cup-shaped rubber-like sealing member attached to the leading face of said piston head, the outside diameter of said sealing member being not less than the inside diameter of said cylinder, whereby the peripheral surface of the sides of said sealing member is in fluid sealing engagement with the inside surface of said cylinder along the entire length of said sealing member, the sides of said sealing member being supported against lateral pressure by the inner surface of said cylinder, and whereby the entire cross-sectional area of said sealing member is supported by the leading face of said piston head against longitudinal pressure.

3. In combination with a cylinder and tiltable piston, a piston head, a piston rod secured to the piston head, said cylinder having a sealing head formed with a port, a valve head cooperating with said port and secured to said piston head by means of a chain, a spring surrounding said chain and interposed between said valve head and piston head whereby said valve and piston heads are held spaced apart but flexibly connected, so that the valve head may be always effectively seated against said port as the piston head and piston rod are oscillated through an arc with respect to said cylinder during reciprocation of the piston.

4. In combination with a piston and cylinder construction wherein the axis of the piston is oscillated or tilted during reciprocation, a disc-like piston head having its maximum diameter at its leading edge, the said diameter of the piston head being such that said leading edge makes line contact with the inner wall of the cylinder when the piston head is in an untilted position, a cup-shaped sealing member composed of a readily distortable material attached to the leading face of said piston head with the peripheral surface of said sealing member in continuous contact with the inner surface of the wall of said cylinder, said sealing member being distortable to maintain its sealing relation with said piston and cylinder as the line contact between the cylinder and piston is broken when the latter is tilted.

5. In combination with a piston and cylinder construction, a disc-like piston head having its maximum diameter at its leading edge, the said diameter of the piston head being such that said leading edge makes substantially a line contact with the inner wall of the cylinder, a cup-shaped sealing member composed of readily distortable material attached to the leading face of said piston head and extending to its marginal edge whereby the piston head supports all of the material composing said sealing member against distortion by longitudinal pressure exerted on said cup-shaped sealing member.

6. A cylinder and piston construction comprising a cylinder having a sealing head provided with an inlet port, a piston in said cylinder, said piston having a disc-like rigid head portion, the maximum diameter of said disc-like head portion being at its leading edge, the relative diameter of the disc-like head and the inside of the cylinder being such that only the forward edge of said disc-like head contacts the wall of the cylinder, a cup-shaped sealing member of substantial length associated with the leading face of said piston head, the outside diameter of said cylinder being such whereby the peripheral surface of the sides of said sealing member are in fluid sealing engagement with the inside surface of said cylinder along the entire length of said sealing member, the sides of said sealing member being supported against lateral pressure by the inner surface of said cylinder, and whereby the entire cross-sectional area of said sealing member is supported by the leading face of said piston head against longitudinal pressure.

JAMES W. HATCH.